United States Patent [19]

Greene

[11] 4,283,524

[45] Aug. 11, 1981

[54] PROCESS FOR POLYMERIZATION OF COMPOSITION COMPRISING (1) ALPHA,BETA-UNSATURATED MONOCARBOXYLIC ACID OR AMMONIUM SALT THEREOF AND (2) AMMONIA

[75] Inventor: Janice L. Greene, Chagrin Falls, Ohio

[73] Assignee: The Standard Oil Company, Cleveland, Ohio

[21] Appl. No.: 32,327

[22] Filed: Apr. 23, 1979

[51] Int. Cl.$^3$ ............................................ C08G 69/00
[52] U.S. Cl. .................................... 528/363; 526/311; 526/317; 528/271; 528/310; 528/325; 528/328
[58] Field of Search .......................................... 528/363

[56] References Cited

U.S. PATENT DOCUMENTS

| | | | |
|---|---|---|---|
| 2,691,643 | 10/1954 | Chirtel et al. | 528/310 |
| 2,749,331 | 6/1956 | Breslow | 526/240 |
| 3,126,353 | 3/1964 | Lautenschlager | 528/363 |
| 3,220,983 | 11/1965 | Schmidt et al. | 528/313 |
| 3,499,879 | 3/1970 | Kobayashi et al. | 528/310 |

OTHER PUBLICATIONS

Chemical Abstracts, vol. 70, 1969, 73553x.

*Primary Examiner*—Harold D. Anderson
*Attorney, Agent, or Firm*—William D. Mooney; Herbert D. Knudsen; Larry W. Evans

[57] ABSTRACT

Polymers containing amide linkages can be formed in good yields by the dehydrative addition polymerization of alpha, beta-unsaturated monocarboxylic acids or the ammonium salts thereof. These polymers are suitable for use as fibers, plastics, films and molding resins.

39 Claims, No Drawings

PROCESS FOR POLYMERIZATION OF COMPOSITION COMPRISING (1) ALPHA,BETA-UNSATURATED MONOCARBOXYLIC ACID OR AMMONIUM SALT THEREOF AND (2) AMMONIA

BACKGROUND OF THE INVENTION

This invention relates to new polymers containing amide linkages and to a process for preparing such polymers. More particularly, this invention relates to the polymerization of alpha, beta-unsaturated monocarboxylic acids or the ammonium salts thereof.

There are several known methods for producing nylon-3 type polymers using starting materials different from those of the present invention. For example, as described in U.S. Pat. No. 2,749,331, polyamides can be prepared from acrylamide by hydrogen transfer polymerization in the presence of a basic catalyst. Other processes for preparing polyamides employ beta-lactam and a ring opening polymerization (U.S. Pat. No. 3,220,983), condensation hydrolysis of beta aminopropionitrile (U.S. Pat. No. 3,499,874), condensation hydrolysis of oxydipropionitrile (Japan No. 68 27,617), thermal condensation of beta-alanine (U.S. Pat. No. 2,691,643) and the thermal polymerization of ethylene cyanohydrin (U.S. Pat. No. 3,125,353).

Most polyamides are produced by a condensation polymerization process. In other words, the polymerization occurs primarily by the reaction between pairs of functional groups, with water split out. For example, the thermal condensation of beta-alanine proceeds as follows:

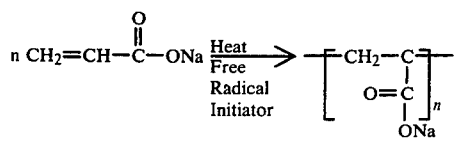

It is also known that the inventive reactants, i.e., alpha, beta-unsaturated carboxylic acids and salts thereof, can be polymerized. This polymerization is a vinyl polymerization, (U.S. Pat. No. 2,956,046), and results from a free radical mechanism, the polymerization taking place across a double bond without formation of a side product. This reaction proceeds as follows:

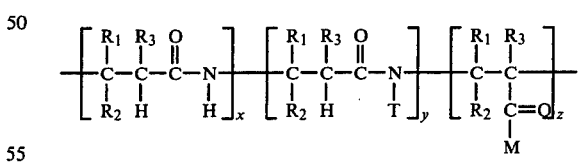

It is an object of this invention to provide a novel process wherein high yields of new polyamides can be directly produced from alpha, beta-unsaturated monocarboxylic acids or the ammonium salts thereof.

SUMMARY OF THE INVENTION

It has now been discovered that a resinous polymer containing amide linkages can be produced by reacting alpha, beta-unsaturated monocarboxylic acids or the ammonium salts thereof in the presence of ammonia. It has also been discovered that controlling the amount of water in the process will result in high yields of a high molecular weight polymer. Finally, it has been discovered that the ratio of amide structural units to vinyl structural units in the polymer backbone can be adjusted by controlling process variables such as the partial pressure of ammonia.

Thus, in accordance with this invention, a resinous polymer containing amide linkages is produced by a process comprising reacting at least one alpha, beta-unsaturated monocarboxylic acid or ammonium salt thereof in the presence of ammonia. In particular, the inventive process results in high yields of a water insoluble polymer containing amide linkages when at least one of acrylic acid or methacrylic acid or the ammonium salt thereof is heated in the presence of ammonia to a temperature of 100° C. to 250° C. at superatmospheric pressure while controlling the concentration of water at a low enough level so that said resinous polymer forms, and then recovering said polymer.

DETAILED DESCRIPTION

The Polymer

The resinous polymers obtained by the process of this invention are methanol insoluble and are characterized as containing ethylene amido linkages in the polymer backbone. These polymers containing ethylene amido linkages, i.e. amide structural units, are generally defined as having repeating units as follows:

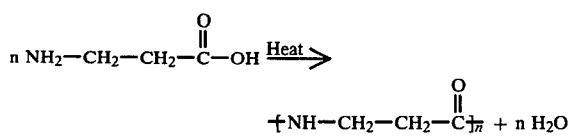

wherein $R_1$, $R_2$ and $R_3$ are suitable substituent groups which, in the simplest embodiment of the invention, would all be hydrogen.

More specifically, the resinous polymer product usually comprises a random mixture of amide structural units and ethylene carboxyl or ammonium salt thereof structural units, i.e. vinyl structural units. Moreover, this polymer may contain branched chains wherein these branched chains comprise amide and vinyl structural units. These branched chains are attached to the polymer backbone as shown below.

The resinous polymer can be represented in the formula:

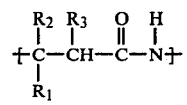

wherein $R_1$, $R_2$ and $R_3$ are defined below, T is a branched chain site, M is OH, $ONH_4$, $ONH_2T$ or NHT and x, y and z are independently the number of such structural units in the resinous polymer of the invention.

The properties of the polymers obtained by the inventive process vary depending upon the monomer or monomers used, the amide/vinyl ratio and the molecular weight. The preferred resinous polymers are white solids and melt at about 250° C. to 350° C. with decomposition. X-ray diffraction patterns have shown that these polymers are crystalline. These polymers can also be hydrolyzed under strenuous conditions.

Preferred polymers have an amide/vinyl ratio $(x+y)/z$ of at least 1.0. It is even more preferred to have an amide/vinyl ratio of 3.0, and the most preferred polymer has an amide/vinyl ratio of at least 5.5.

It is also possible to produce copolymers containing two or more alpha, beta-unsaturated acids or the ammonium salts thereof. For example, a polymer having the following repeating structural units:

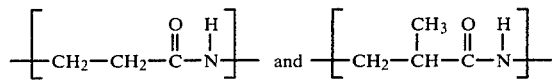

is within the scope of this invention.

These polymers also have a wide range of intrinsic viscosities and molecular weights. Preferred polymers have an intrinsic viscosity greater than 0.70, more preferred polymers have an intrinsic viscosity greater than 1.0 and most preferred polymers have an intrinsic viscosity greater than 1.5. Moreover, preferred polymers have a molecular weight of at least 10,000. More preferred polymers have a molecular weight of at least 85,000 and most preferred polymers have a molecular weight of at least 150,000.

The Process

The polymer is produed by a dehydrative addition reaction. In its most simple embodiment, the overall dehydrative addition polymerization reaction proceeds as follows:

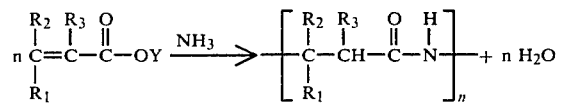

wherein Y is H or $NH_4$.

It can be seen from this formula that the dehydrative addition reaction both splits out water and saturates the double bond.

Reactants

Any alpha, beta-unsaturated monocarboxylic acid or the ammonium salt thereof can be polymerized in accordance with this invention. The preferred acids or salts thereof contain less than 40 carbon atoms and are represented by the following formula:

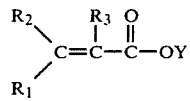

wherein Y is either H or $NH_4$; and
wherein $R_1$, $R_2$ and $R_3$ are each independently selected from the group consisting of:
(1) hydrogen;
(2) $C_{1-30}$ alkyl;
(3) 5 to 7 member nitrogen containing heterocylic radicals;
(4) mono and poly carbocyclic radicals containing up to 30 carbon atoms; and
(5) halides.

More preferred acids or salts thereof are those wherein $R_1$, $R_2$ and $R_3$ are each independently selected from:

(1) hydrogen;
(2) $C_{1-5}$ alkyls; and
(3) 5 or 6 member carbocyclic radicals.

If the salt is substituted with two or more bulky groups, steric hindrance may become a factor and the reaction rate may be reduced.

The most preferred acids or salts thereof are those wherein $R_1$, $R_2$ and $R_3$ are each independently selected from hydrogen and methyl. Examples of ammonium salts of alpha, beta-unsaturated monocarboxylic acids which are included within the scope of this invention are ammonium acrylate, ammonium methacrylate and ammonium crotonate. Examples of the corresponding alpha, beta-unsaturated monocarboxylic acids which are within the scope of this invention are acrylic acid, methacrylic acid and crotonic acid. Mixtures of the above acids and/or salts can also be polymerized in accordance with the invention to form copolymers.

Ammonia must also be present in the reaction system. The ammonia can be added directly in the form of gaseous ammonia, or it could be added as aqueous ammonium hydroxide so long as the water concentration is not excessive. Normally, sufficient ammonia is available for the reaction if the ammonium salt of the alpha, beta-unsaturated acid is employed. It is preferred to have at least one mole of ammonia per mole of alpha, beta-unsaturated monocarboxylic acid in the reaction system.

Process Condition

The dehydrative addition reaction can be conducted under a broad range of process conditions. For example, it is possible to conduct the dehydrative addition of ammonium acrylate by the thermal reaction of the salt in the presence of ammonia. In more complicated reactions, alpha, beta-unsaturated acids can be reacted in the presence of a superatmospheric pressure of ammonia using solvents and catalysts or inhibitors.

There are several process parameters which are important to the practice of this invention. The interrelationship of various process conditions and their affect on the polymers produced are discussed below.

Control of the amount of available water in the reaction system is important. Excessive amounts of water at least partially inhibits the desired polymerization. The amount of water which can be present in the reaction system will depend upon a number of factors including the reactants employed, process conditions and desired products. In general, if a lower molecular weight polymer is desired, the amount of water is not that critical, but if a higher molecular weight polymer is desired special steps may be required to actively remove water from the reaction system. With a given set of reactants and process conditions, the effect of different water concentrations can be readily determined and then controlled to produce the desired resinous polymer.

Broadly, use of less than five moles of water per mole of ammonium salt is desirable, more preferred would be the use of less than three moles of water with the use of less than 1.0 mole of water per mole of the ammonium salt in the reaction system being most preferred.

As disclosed above, for every mole of polyamide produced a mole of water is also produced. Thus, even if there is no water present at the start of the reaction, water will soon be formed due to the dehydrative addition reaction. It may be desirable to reduce the amount of water during the course of the reaction on a continuous or intermittant basis. This water can either be removed from the reaction system or something can be added to the reaction system which will tie-up the water, e.g. molecular sieves and metal alkoxides.

In order to obtain the highest molecular weight polymer, it may be advantageous to add a small amount of water to the polymerization reaction. It is preferred to add between 0.01 and 1.0 moles of water per mole of alpha, beta-unsaturated monocarboxylic acid or ammonium salt thereof, more preferred would be the addition of between 0.05 and 0.7 moles of water. As the polymerization proceeds, sufficient water is removed to maintain the water concentration in the system between these limits.

It has also been discovered that the rato of the amide structural units to the vinyl structural units can be adjusted by controlling the partial pressure of ammonia in the reaction system. As the ammonia partial pressure increases the percentage of amide linkages in the polymer increases. With a given set of reactants and other process conditions, the ammonia partial pressure can be varied to establish within broad limits the desired percentage of amide structural units.

Another important factor is the conduct of the reaction to the extent to which the reactants are able to physically contact each other so that the desired reaction can occur. Although suitable contact time can be established by maintaining the reactants in the solid, liquid or gaseous phase, it is preferred to perform the reaction with the alpha, beta-unsaturated monocarboxylic acid or ammonium salt thereof in the liquid phase. This liquid phase can be obtained by various methods including the use of solvents that will dissolve the acid or salt thereof without interferring with the polymerization reaction.

In the preferred practice of the invention, the acids or salts thereof are maintained at a temperature above their melting points but below the decomposition temperature of the reactants or products, which is generally about 350° C. It is more preferred to conduct this process at a temperature between 100° C. and 250° C., and conducting the process between 125° C. and 200° C. is most preferred.

The temperature and amount of time required for polymerization are interrelated. At low temperatures it will take longer for a resinous polymer to form than at high temperatures. In general, the reaction is conducted in less than 48 hours, with times ranging from 2 to 20 hours normally being adequate to produce resinous polymers.

It is possible in the present invention to obtan high molecular weight polymers. Broadly, the high molecular weight polymers are produced by controlling the time, temperature and water concentration in the polymerization process. In general, highest molecular weight polymers are produced over extended periods of time at moderately high temperatures with removal of the water generated in the reaction.

Although polymerization can be effected in contact with the atmosphere, a more desirable group of polymers having high intrinsic viscosities and molecular weights can be obtained by carrying out the polymerization in the absence of oxygen. This can be achieved by blanketing the reaction mixture with either an inert gas such as nitrogen or with gaseous ammonia.

The instant reaction can proceed at atmospheric, superatmospheric or subatmospheric pressure. Preferably, the reactants are heated under superatmospheric pressures. It has generally been found that pressures such as 0 psig to 5000 psig are preferable with 50 to 2000 psig being most preferable. After the polymerization has proceeded for a suitable time, it is preferable to maintain the pressure at 0 to 100 psig to remove water and other volatile materials. Finally, either subatmospheric pressure or a continuous flow of inert gases may be used to pull-off more water and other volatiles.

The polymerization process of the instant invention can proceed by any of the generally known modes of polymerization including bulk, slurry, suspensions or solution polymerization by batch, continuous or intermittant addition of the monomers and other components.

It is often convenient to carry out the instant polymerization in the presence of a diluent which may also be a solvent for the reactants, products or both. Inert diluents which can be used in the process of this invention include hydrocarbons such as benzene, toluene, xylene, ethylbenzene, solvent naphtha, n-hexane, cyclohexane, isooctane and decalin; tertiary alcohols such as tertiary butanol and tertiary amyl alcohol; ethers such as dioxane, diethyl ether, dibutyl ether and dimethoxyethane; aromatic halogenated compounds such as chlorobenzene and dichlorobenzene; and tertiary amines such as triethylamine, tributylamine, pyridine and methylaniline. Other solvents which may be used in the instant process include N-methyl-2-pyrrolidone, phenol, cresols and hexafluoroisopropanol. In addition to these organic diluents, an anhydrous solvent such as liquid ammonia may also be used.

No catalyst or inhibitor is needed to conduct the reaction. It may be possible to adjust the ratio of amide/vinyl structural units in the polymer product by the addition of vinyl polymerization initiators and inhibitors. Vinyl initiators may decrease the amide/vinyl ratio while the addition of vinyl inhibitors may increase this ratio. The preferred polymers are obtained in the absence of added vinyl polymerization initiators. Examples of vinyl polymerization inhibitors include hydroquinone, p-methoxyphenol, N-phenyl-2-naphthylamine, pyrocatechol and phenothiazine. The amount of such an inhibitor which may be added can vary over a wide range, but generally is within the range of from about 0.005% to 0.1% based on the weight of the monomer.

It may also be advantageous to add a catalyst to this reaction system. By using a catalyst in the reaction, not only can the rate of the polymerization be increased but also the reaction temperature can be decreased. Moreover, the polyamide obtained has a high molecular weight.

Catalysts which can be used in this process include the amino acids. For example, it has been discovered that the use of beta-amino acids, e.g. beta-alanine, increases the percent of water insoluble polymer obtained in the instant process. The amount of catalyst used is preferably from 0.0001 to 1 mole per mole of alpha, beta-unsaturated monocarboxylic acid or ammonium salt thereof.

It may be desirable to add a monofunctional capping agent to terminate these amide-containing polymers. As will be appreciated in this art, many different terminal groups can be introduced into the polymers of the invention without affecting the basic nature thereof or departing from its scope. It is a usual practice in the art to omit terminal groups from a description of longchain polymers, particularly since such groups are generally not detectable by routine analysis. Nevertheless, for completeness, it will be understood that polymers can be generally represented as being terminated by any known terminals such as, for example, acids, anhydrides, amines, amides and phenols.

Recovery

At the end of the reaction period the unreacted reactants are removed from the reaction mass by any suitable means, e.g. distillation, extraction with a solvent or a mixture of solvents, or by a combination of such techniques. The unreacted material may be removed in conjunction with removal of low molecular weight polymers, if desired. Any suitable solvent or mixture of solvents may be employed in purifying the crude reaction product. The action of the solvent is more or less selective. If the polymerization reaction is carried out in an inert organic diluent in which the polymer is insoluble, it will precipitate and may be removed by filtration, centrifigation, etc. The polymer which is obtained may easily be purifed by extracting it with a liquid that is a solvent from the monomer but which is not a solvent for the polymer. Frequently, water is used for this purpose.

The resinous polymeric materials produced as herein described have a wide variety of applications. Generally, they may be used in any applications calling for a Nylon-type polymer. For example, the instant polymers can be used as fibers, plastics, films, and molding resins.

SPECIFIC EMBODIMENTS

In order to provide a better understanding of the present invention, the following working examples are presented. Each of the polymers produced in the following examples was subjected to infrared spectroscopy and nuclear magnetic resonance spectroscopy. It was found that in every example a polymer was produced which contained at least some amide structural units wherein $R_1$, $R_2$ and $R_3$ were H or $CH_3$. These polymers comprised a mixture of amide and vinyl structural units with, except as otherwise noted, at least 85% of the polymer structural units comprising amide structural units.

Intrinsic viscosities ($\eta$) were determined for several of the polymers produced in the examples. The intrinsic viscosity was determined by weighing a polymer sample and then dissolving this sample in 90% formic acid (Baker Polymer Characteriztion Solvent) at room temperature to make a solution containing about 1 g/100 mls. (dl). The solution was filtered and 10 mls transferred to a Cannon-Ubbelhode dilution viscometer mounted in a constant temperature bath maintained at 25° C. After time was allowed for temperature equilibrium to be reached, the liquid was drawn up through the capillary tube into the bulb by the application of suction and then allowed to fall back through the tube. The time required for it to pass between the two marks etched on the viscometer was recorded to the nearest 0.1 second. The process was repeated until readings agreed within 0.1 second. Five milliliters of solvent were added to the viscometer, the solution was mixed, allowed to come to temperature equilibrium and the efflux time was again measured. This dilution process was repeated at last one more time. Solvent efflux time was determined in the same way. All efflux times were greater than 170 seconds.

The relative viscosity ($\eta_r = t/t_o$) and the specific viscosity ($\eta_{sp} = \eta_r - 1$) were calculated from the efflux times, and the data were plotted as $\eta_{sp}/C$ vs. C and ln $\eta_r/C$ vs. C (C=solute concentration, g/dl). The two lines were extrapolated to zero concentration and their point of intersection read as the instrinsic viscosity ($\eta$).

$$(\eta) = C \xrightarrow{\lim} O \; (\eta_{sp}/C) = C \xrightarrow{\lim} O \; (\ln \eta_r/C)$$

(See ASTM D2857-70, Standard Method of Test for Dilute Solution Viscosity of Polymers.)

Molecular weights of some of these polymers have been determined by laser light scattering in 90% formic acid. A chromatix KMX-6 instrument was used for this determination.

Example 1 thru 6—Effect of Water Concentration on Polymerization of Ammonium Acrylate

Part A—Preparation of Ammomium Acrylate 600 grams of iso-octane and 0.5 grams of N-phenyl-2-naphthylamine were placed in a 2 liter, four-necked glass flask equipped with a stirrer, gas inlet, addition funnel and reflux condenser. The flask was cooled in ice to 0° C. and a solution of 100 grams of acrylic acid and 50 grams of iso-octane was added over a period of 1.5 hours through the addition funnel. It was found that a white solid formed as ammonia was bubbled through the stirred mixture. After 2.5 hours, the flask was transferred to a nitrogen-filled glove bag. This salt was recovered by vacuum filtration and stored in a nitrogen atmosphere until used. The salt was identified as ammonium acrylate.

Part B—Polymerization of Ammonium Acrylate

Examples 1 thru 6 are presented to show the effect of water concentration on polymer formation. The amount of water added to the ammonium acrylate in these examples was varied from 0 to 15 moles of $H_2O$ per mole of ammomium acrylate. The experimental technique was as follows.

Ammonium acrylate, prepared using the process disclosed above, was placed into a 600 ml. glasslined Parr autoclave. Water was added to this ammonium acrylate in an amount as calculated from Table I. The autoclave was sealed and flushed three times with nitrogen. The autoclave was then cooled in dry ice and a slow stream of ammonia gas was passed throught this system for 15 minutes. The gas exit valves were then closed and the autoclave was placed in an electrically heated jacket. It was estimated that about 5 grams of ammonia had been added to the autoclave.

The autoclave and its contents were heated for 1 hour at 135° C. and for 19 hours at 200° C. under autogeneous pressure. After cooling, the autoclave was opened and the product was examined. When a solid was present, the percent water insolubility was determined by extracting the product overnight with hot distilled water. If the product was already in solution, the liquid was stripped in a rotary evaporator at 60° C. and 1 mm. pressure. To the resulting concentrate was added 2.7 times its weight of methanol and the methanol insoluble product was recovered by filtration and examined. The results of the solid and liquid examination are shown in Table I.

TABLE I

Effect of Varying Amounts of Added H₂O on Polyamide Formation

| Example | Grams Ammonium Acrylate Reacted | Moles Added H₂O Mole Ammonium Acrylate | Grams of Polyamide Produced* | % Polyamide Water Insoluble | % Polyamide Methanol Insoluble |
|---|---|---|---|---|---|
| 1 | 85.0 | 0 | 71.0 | 35 | — |
| 2 | 23.2 | 1 | 27.2 | 22 | — |
| 3 | 33.9 | 2 | 45.9 | 0 | 5 |
| 4 | 24.2 | 4 | 21.0 | 0 | 2 |
| 5 | 22.5 | 5 | 0.0 | 0 | 0 |
| 6 | 41.7 | 15 | 0.0 | 0 | 0 |

*Weight of recovered polyamide—contains water in addition to polyamide

Examples 7 thru 9—Removal of Gas During Polymerization p The procedure of Examples 1 thru 6 was followed except that after heating under autogeneous pressure for 1 hour at 135° C. and 1 hour at 200° C., the gas exit line was opened to a back pressure regulator set for 25 psig and the excess gas was vented. Venting the excess gas resulted in a reduction of the amount of water in the reaction system. Heating at 200° C. and 25 psig continued for 16 hours followed by heating for 2 hours at 200° C. and 0 psig with a slow stream of nitrogen gas passing through the system. The products were examined and the results are shown in Table II.

TABLE II

Effect of Removing Gas From Polymerization Systems Containing Varying Amounts of Added H₂O

| Ex. | Grams of Ammonium Acrylate Reacted | Moles Added H₂O Moles Ammonium Acrylate | Grams of Polyamide Produced | % Polyamide Water Insoluble |
|---|---|---|---|---|
| 7 | 85.0 | 0 | 67.0 | 67 |
| 8 | 33.6 | 1 | 26.1 | 63 |
| 9 | 36.0 | 5 | 27.9 | 43 |

Example 10 thru 13—Effect of Polymerizing Ammonium Acrylate at Various Ammonia Concentrations

Example 10—Partially Closed Reaction System (25 psig)

III grams of the ammonium acrylate, prepared by the process of Example 1, were placed in a 1 liter glasslined Parr autoclave. The autoclave was then sealed and flushed 3 times with nitrogen. The autoclave was placed in dry ice and a slow stream of ammonia gas was passed through the system for 10 minutes. The valves were then closed and the autoclave was placed in an electrically heated jacket. It was estimated that about 5 grams of ammonia had been added to the autoclave.

The autoclave and its contents were heated for 1 hour at 135° C. and for 1 hour at 200° C. under autogenous pressure. During this time, the internal pressure reached 72 psig at 135° C. and 100 psig at 200° C. At the end of the second hour the autoclave gas exit line was opened to a back pressure regulator set for 25 psig and the excess gas was vented. Heating at 200° C. and 25 psig continued for 16 hours, followed by 1 hour at 0 psig back pressure and 1 hour with a slow stream of nitrogen passing through the system.

After cooling, the autoclave was opened and 77.4 grams of a white solid which was identified as a polyamide were recovered. Upon extracting overnight with hot distilled water, the polyamide was found to have a water insolubility of 81% and a melting point (with decomposition) of 343° C. to 347° C. The intrinsic viscosity of this polyamide was 0.19.

Example 11—Partially Closed Reaction System (0 psig)

The procedure of Example 10 was repeated except that 90.5 grams of ammonium acrylate were used and the back pressure regulator was set at 0 psig instead of 25 psig. 73.5 grams of a polyamide were recovered. This polyamide was found to have a water insolubility of 66.5%.

Example 12—Reaction System Open to Atmosphere with Ammonia Addition 57.8 grams of ammonium acrylate, prepared by the process disclosed in Example 1, were placed in a 600 ml. glasslined Parr autoclave. The autoclave was then sealed and flushed 3 times with nitrogen. The gas exit valve was then left open to the atmosphere and the autoclave was placed in an electrically heated jacket. A slow stream of ammonia gas was passed continuously through the system while the autoclave and its contents were heated for 1 hour at 135° C. and for 19 hours at 200° C. at 0 psig. After cooling, the autoclave was opened and 45.2 grams of a polyamide were recovered. Upon extracting overnight with hot distilled water, the polyamide was found to have a water insolubility of 56%.

Example 13—Reaction System Open to Atmosphere 50.8 grams of ammonium acrylate, prepared by the process disclosed in Example 1, were placed in a 600 ml. glasslined Parr autoclave. The autoclave was sealed and flushed 3 times with nitrogen. The gas exit valve was then left open to the atmosphere and the autoclave was placed in an electrically heated jacket.

The autoclave and its contents were heated for 1 hour at 135° C. and 19 hours at 225° C. at 0 psig. After cooling, the autoclave was opened and 37.3 grams of a polyamide were recovered. Upon extracting overnight with hot distilled water, the polyamide was found to have a water insolubility of 12%.

TABLE III

Effect of Varing Ammonia Concentrations on Polymerization of Ammonium Acrylate

| Example | Reaction Conditions | Amide/Vinyl Ratio in Polymer* |
|---|---|---|
| 10 | Partially Closed System (25 psig) | 88/12 |
| 11 | Partially Closed System (0 psig) | 71/29 |
| 12 | System Open to Atmosphere with Ammonia Bubbled Through | 53/47 |

TABLE III-continued
Effect of Varing Ammonia Concentrations
on Polymerization of Ammonium Acrylate

| Example | Reaction Conditions | Ratio in Polymer* Amide/Vinyl |
|---|---|---|
| 13 | System Open to Atmosphere | 31/69 |

*The amide/vinyl ratio was calculated as follows. The relative amide/acid ratio was determined by infrared spectra for the crude polymer (water soluble plus water insoluble fractions). The amide/vinyl ratio for the water insoluble polymer produced in Example 10 was determined by NMR spectra. It was assumed that the amide/vinyl ratio and the amide/acid ratio would be substantially the same. Thus, once the relative amide/acid ratios were known for Examples 10 to 13 and the amide/vinyl ratio was known for Example 10, it was possible to calculate the amide/vinyl ratio for Examples 11 to 13.

Examples 14 thru 23—Effect of Various Process Conditions on the Polymerization of Ammonium Acrylate Ammonium acrylate, prepared by the process disclosed in Example 1, was placed in a 1 liter glasslined Parr autoclave. The autoclave was sealed and flushed three times with nitrogen. A slow stream of ammonia gas was then passed through the system for 15 minutes. The gas exit valves were then closed and the autoclave was placed in an electrically heated jacket. It was estimated that about 5 grams of ammonia had been added to the autoclave. The autoclave and its contents were then heated at various temperatures and pressures.

After cooling, the autoclave was opened and a polyamide was recovered. The solvent, i.e. methanol or water, insolubilty of the solid was determined by extracting the product overnight with hot solvent.

TABLE IV
Polymerization of Ammonium Acrylate Under Various Process Conditions

| Example | Grams of Ammonium Acrylate | Time (Hr) | Ext. Temp (°C.) | Pres (psig) | % Polyamide Water Insoluble | % Polyamide Methanol Insoluble |
|---|---|---|---|---|---|---|
| 14 | 25.3 | 1.0 | 135 | Autogeneous | 74.0[1] | — |
|  |  | 1.0 | 200 | Autogeneous |  |  |
|  |  | 16.0 | 200 | 25 |  |  |
|  |  | 2.0 | 200 | 0 |  |  |
| 15 | 160.9 | 2.0 | 200 | Autogeneous | 66.0 | — |
|  |  | 16.0 | 200 | 25 |  |  |
|  |  | 1.0 | 200 | 0 |  |  |
| 16 | 34.7 | 1.3 | 135 | Autogeneous | 0.0 | 26.0 |
|  |  | 1.0 | 200 | Autogeneous |  |  |
|  |  | 2.0 | 200 | 0 |  |  |
| 17 | 46.3 | 1.0 | 135 | Autogeneous | 67.0 | — |
|  |  | 1.0 | 225 | Autogeneous |  |  |
|  |  | 8.0 | 225 | 25 |  |  |
|  |  | 2.0 | 225 | 0 |  |  |
| 18[2] | 39.4 | 1.6 | 135 | 350 | 87.5 | — |
|  |  | 5.0 | 200 | 800 |  |  |
|  |  | 16.0 | 200 | 25 |  |  |
|  |  | 2.0 | 200 | 0 |  |  |
| 19[3] | 40.3 | 2.0 | 135 | 850 | 97.0 | — |
|  |  | 5.0 | 200 | 980 |  |  |
|  |  | 16.0 | 200 | 50 |  |  |
|  |  | 2.0 | 200 | 0 |  |  |
| 20 | 27.0 | 2.3 | 150 | Autogeneous | 12.6 | — |
|  |  | 60.7 |  | 25 |  |  |
|  |  | 2.0 |  | 0 |  |  |
| 21 | 41.0 | 2.3 | 135 | Autogeneous | 7.0 | 55.0 |
|  |  | 63.7 |  | 25 |  |  |
|  |  | 2.0 |  | 0 |  |  |
| 22[5] | 43.0 | 1.0 | 100 | Autogeneous | 0.0 | 0.0 |
|  |  | 139.0 |  | 25 |  |  |
|  |  | 2.0 |  | 0 |  |  |
| 23[5] | 33.0 | 1.0 | 75 | Autogeneous | 0.0 | 0.0 |
|  |  | 137.0 |  | 25 |  |  |
|  |  | 2.0 |  | 0 |  |  |

[1]This polymer had an intrinsic viscosity of 0.36 and a molecular weight of 47,500.
[2]Autoclave was pressurized with isobutylene.
[3]Autoclave was pressurized with nitrogen.
[4]The internal temperature was 100° C.
[5]Since no polyamide formed, these are not examples of the invention.
[6]The internal temperature was 85° C.
[7]The internal temperature was 72° C.

Example 24—Polymerization of Ammonium Acrylate in Presence of Beta-Alanine

The process of Example 14 was repeated except that 19.0 grams of ammonium acrylate and 1.4 grams of beta-alanine were added to the autoclave. 16.0 grams of a polyamide were recovered. This polyamide was found to have a water insolubility of 90%.

Example 25—Polymerization of Aqueous Ammonium Acrylate

Part A—Preparation of Ammonium Acrylate

In a three-necked, 500 ml. flask, equipped with a stirrer, reflux condenser and addition funnel, was placed 70 grams of concentrated ammonium hydroxide. The reaction flask was cooled in ice while 72 grams of acrylic acid was added slowly from the addition funnel to the stirred mixture over a period of 1.5 hours. After 3.5 hours, the product was stripped on a rotary evaporater at 30° C. to 40° C. and 1 mm. to give 89 grams of ammonium acrylate.

Part B—Polymerization of Ammonium Acrylate 10.8 grams of the ammonium acrylate produced in Part A and 0.1 grams of p-methoxyphenol, a free radical inhibitor, were placed in a 50 ml. glasslined pipe bomb reactor. The reactor was flushed with a slow stream of nitrogen for 20 minutes and then heated at 135° C. for 17.5 hours at 0 psig and for 24 hours at 200° C. After cooling, the reactor was opened and 8.4 grams of a polyamide were recovered. Upon extracting overnight with hot distilled water, the polymer was found to have an insolubility of 70.5%.

Example 26—Polymerization of Ammonium Acrylate in Solvent 4.3 grams of ammonium acrylate, prepared by the process disclosed in Example 1, 12.7 grams of a solvent, N-methyl-2-pyrrolidone, and 0.1 grams of a free radical inhibitor, p-methoxyphenol, were placed in a 50 ml. glass-lined pipe bomb reactor. Upon shaking a clear solution was obtained. The reactor was flushed with a slow stream of ammonia gas for 20 minutes and then heated at 200° C. at a pressure of 0 psig for 17.5 hours to give a viscous yellow syrup which deposited a white solid when poured into water. The white solid was vacuum dried to give 2.4 grams of a polyamide.

Example 27—Polymerization of Ammonium Acrylate in Solvent 38.9 grams of ammonium acrylate and 118 grams of a solvent, m-cresol, were placed in a 1 liter glasslined Parr autoclave. The autoclave was sealed and flushed three times with nitrogen. The autoclave was then cooled in dry ice and a slow stream of ammonia gas was passed through the system for 45 minutes. The valves were then closed and the autoclave was placed in an electrically heated jacket.

The autoclave and its contents were heated at 150 psig for 1 hour at 135° C. and for 1 hour at 200° C. with the excess gas vented through back pressure regulator. The autoclave was then heated at 200° C. and 25 psig for 16 hours followed by 2 hours at 0 psig with a slow stream of nitrogen passing through the system while the jacket temperature remained at 200° C.

After cooling, the autoclave was opened and 124.6 grams of a light yellow syrup was removed and poured into 500 mls. cold methanol to give a white precipitate. Filtering and washing with four 150 ml. portions of methanol gave 21.6 grams of a polyamide. Upon extracting overnight with hot distilled water, the methanol insolubility of the polymer was found to be 12%.

Example 28—Polymerization of Ammonium Acrylate Without Inhibitor 400 grams of diethylether were placed in a 1 liter four-neck glass flask equipped with stirrer, gas inlet, addition funnel and reflux condensor. The reaction flask was cooled in ice and a solution of 80 grams of acrylic acid in 50 grams of diethylether was slowly added from the addition funnel over a period of 2 hours while ammonia gas was bubbled through the stirrer mixture. After 3.5 hours, the flask was transferred to a nitrogen-filled glove bag and ammonium acrylate was recovered by vacuum filtration.

The procedure of Example 14 was repeated using 40.4 grams of ammonium acrylate prepared as shown above. After cooling, the autoclave was opened and 31.4 grams of a polyamide were recovered. Upon extracting overnight with hot distilled water, the polyamide was found to have a water insolubility of 83%.

Example 29—Preparation of Amide-Containing Polymer from Acrylic Acid and Ammonia 3.0 grams of acrylic acid, 0.01 grams of a free radical inhibitor, N-phenyl-2-naphthylamine and 10 ml. of a diluent, decalin, were placed in a 50 ml. glasslined pipe bomb reactor. Upon shaking a clear solution was obtained. The reactor was placed in an ice bath and flushed with a slow stream of nitrogen for 15 minutes and with a nitrogen-ammonia (1:1) mixture for 1.5 hours. The reactor was then heated for 17 hours at 135° C. and for 23.5 hours at 200° C. at 0 psig. After cooling, the reactor was opened and the product was vacuum dried to remove any adhering liquid. 2.8 grams of a polyamide was recovered.

Examples 30 thru 32—Effect of Water Concentration on Intrinsic Viscosity

Ammonium acrylate, prepared by the process disclosed in Example 1, and distilled water were placed in a 600 ml. glasslined Parr autoclave. The autoclave was sealed and flushed three times with nitrogen. A slow stream of ammonia gas was then passed through the system for 15 minutes. The gas exit valves were then closed and the autoclave was placed in an electrically heated jacket. The autoclave and its contents were then heated under autogeneous pressure for 1 hour at 135° C. and for 1 hour at 200° C. The gas exit line was opened to a back pressure regulator set for 35 psig and the excess gas vented. Heating at 200° C. and 35 psig continued for 16 hours, followed by heating at 200° C. for 2 hours at 0 psig back pressure.

After cooling, the autoclave was opened and a polyamide was recovered. The percent water insolubility was determined by extracting the product overnight with hot distilled water. Intrinsic viscosities of these polyamides are shown in Table V.

TABLE V

| | Effect of Varying Amounts of Added $H_2O$ On Intrinsic Viscosity of Polyamides | | | |
|---|---|---|---|---|
| Example | Grams of Ammonium Acrylate Reacted | Moles Added $H_2O$ Mole Ammonium Acrylate | % Polyamide Water Insoluble | Intrinsic Viscosity |
| 30 | 45.0 | 0.011 | 45 | 0.23 |
| 31 | 45.7 | 0.110 | 40 | 0.74[1] |
| 32 | 51.6 | 0.960 | 37 | 0.51 |

[1]The molecular weight was determined to be 95,000.

Example 33—Preparation of High Viscosity Amide-Containing Polymer from Ammonium Acrylate 3.39 grams of ammonium acrylate and 0.21 grams of potassium-t-butoxide (5% molar ratio of potassium-t-butoxide) were placed in a 25 ml. glass ampule. The glass ampule was purged with nitrogen for 10 minutes and the valves were then closed. This ampule was heated at 175° C. for 6 hours. Upon cooling, it was determined that the solid formed had a water insolubility of 53.7%. The infrared and NMR spectra showed the presence of amide linkages. Intrinsic viscosity of this polyamide was 1.59.

Example 34—Polymerization of Ammonium Methacrylate 9.0 grams of ammonium methacrylate and 0.1 grams of p-methoxyphenol were placed in a glasslined 50 ml. pipe bomb reactor. The reactor was flushed with a slow stream of nitrogen for 20 minutes and then heated for 17.5 hours at 135° C. and for 24 hours at 200° C. at 0 psig. After cooling, the reactor was opened and 5.7 grams of a polyamide, melting point 250° C. to 270° C., was recovered. The intrinsic viscosity of this polyamide was 0.06.

Example 35—Polymerization of Ammonium Crotonate

Part A—Preparation of Ammonium Crotonate 20 grams of crotonic acid and 140 grams of isooctane were placed in a 250 ml. three-necked flask equipped with gas inlet, stirrer and a reflux condensor. This mixture was heated with stirring until a clear solution was obtained. Ammonia gas was bubbled through the stirred mixture for 1 hour while the reaction temperature was allowed to return slowly to room temperature. The flask was then transferred to a nitrogen-filled glove bag and the ammonium crotonate was recovered by vacuum filtration and stored in a nitrogen atmosphere in a sealed container until used.

Part B—Polymerization of Ammonium Crotonate 17.6 grams of ammonium crotonate, prepared using the process disclosed above, was placed into a 600 ml. glasslined Parr autoclave. The autoclave was sealed and flushed three times with nitrogen. The autoclave was then cooled in dry ice and a slow stream of ammonia gas was passed through the system for 30 minutes. The gas exit valves were then closed and the autoclave was placed in an electrically heated jacket.

The autoclave and its contents were heated under autogeneous pressure for 1 hour at 135° C. and for 0.25 hours at 200° C. At the end of this time, the autoclave gas exit line was opened to a back pressure regulator set for 25 psig and the excess gas was vented. Heating at 200° C. and 25 psig continued for 16 hours, followed by 2 hours at 200° C. and the back pressure regulator set at 0 psig.

After cooling, the autoclave was opened and 15.1 grams of a polyamide were recovered. Upon extracting overnight with hot distilled water, the polyamide was found to have a water insolubility of 20%.

Example 36—Copolymerization of Ammonium Acrylate and Ammonium Methacrylate 10.2 grams of ammonium acrylate and 7.9 grams of ammonium methacrylate were placed in a 50 ml. glasslined pipe bomb reactor. The reactor was heated for 16 hours at 135° C. and for 22 hours at 200° C. After cooling, the reactor was opened and 8.0 grams of a polymer, melting point 300° C. to 310° C., were recovered. The intrinsic viscosity of this polymer was 1.75. Spectroscopic examination showed that both

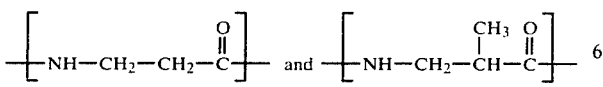

structural units were present in the polymer.

Example 37—Preparation of Amide-Containing Copolymer from Acrylic Acid and Methacrylic Acid 250 grams of iso-octane were placed in a 1 liter four-necked flask equipped with a stirrer, gas inlet, addition funnel and reflux condenser. The reaction flask was cooled in ice and a solution of 25 grams of acrylic acid, 30 grams of methacrylic acid and 64 grams of iso-octane were added over a period of 1.5 hours through the addition funnel while ammonia gas was bubbled through the stirred mixture. After 2.5 hours, the flask was transferred to a nitrogen-filled glove bag and an ammonium salt was recovered by vacuum filtration. 29.2 grams of the salt prepared above was placed in a 600 ml. glasslined Parr autoclave. The autoclave was sealed and flushed 3 times with nitrogen. The autoclave and its contents were heated for 1 hour at 135° C. and for 1 hour at 200° C. under autogeneous pressure. During this time, the internal pressure reached 55 psig at 135° C. and 70 psig at 200° C. At the end of the second hour the autoclave gas exit line was opened to a back pressure regulator set for 50 psig and the excess gas was vented. The autoclave was then heated for 47 hours at 200° C. and 50 psig. After cooling, the autoclave was opened and 23 grams of a white solid which was identified as a polyamide were recovered. Upon extracting overnight with hot distilled water, the polymer was found to have a water insolubility of 54% and a melting point of 280° C. to 290° C. Spectroscopic examination shows that both

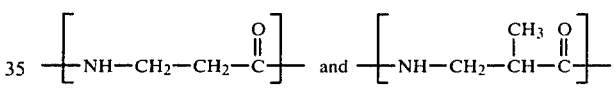

structural units were present in the polymer.

Example 38—Hydrolysis of Water Insoluble Polyamide 26.1 grams of a water insoluble polyamide, prepared using the process of Example, and 33.1 grams of distilled water were placed into a 1 liter glasslined Parr autoclave. The autoclave was sealed and flushed three times with nitrogen. The autoclave was then cooled in dry ice and a slow stream of ammonia gas was passed through the system for 15 minutes. The gas exit valves were then closed and the autoclave was placed in an electrically heated jacket. It was estimated that about 5 grams of ammonia had been added to the autoclave.

The autoclave and its contents were heated under autogeneous pressure for 1 hour at 135° C. and for 19 hours at 200° C. After cooling, the autoclave was opened and the product was examined. Upon extracting overnight with hot distilled water, the water insolubility of the polymer was found to be 27%. It was determined that 73% of the water insoluble polyamide had been converted to beta-alanine and low molecular weight water soluble polyamide.

Comparative Examples A, B, and C—Determination of Intrinsic Viscosity of Nylon-3 Type Polyamides Prepared By Prior Art Techniques

Comparison A—Polyamide Prepared from Acrylamide

A Nylon-3 type polyamide was prepared from acrylamide by the technique disclosed in an article authored by Breslow (J. Am. Chem. Soc. 79, 3760 (1957)). The specific experimental procedure followed in this comparison is disclosed on page 3763 of this article (Polymerization of Acrylamide in Pyridine). This experimental technique was as follows.

A 250 ml., three-necked flask was fitted with an electrically driven stirring paddle, a reflux condenser and a nitrogen inlet. This flask was heated by an oil bath. 10 grams of acrylamide was added with stirring at 110° C. to a solution of 100 ml. of pyridine (dried over anhydrous mangesium sulfate). The flask and its contents were heated to 110° C. under a nitrogen purge for 30 minutes. The reaction was then initiated with 10 mls. of a solution of 0.93 grams potassium metal in 46.3 grams of t-butanol. Polymer began to form on the walls in about 5 minutes. After heating for 16 hours at 110° C., the hard brittle solid was removed from the flask walls and stirring blade. This solid was then filtered and dried to yield 7.7 grams of a hard white solid.

The solid was extracted with water in a soxhlet extractor for 24 hours. The water insoluble fraction of the solid was 68%. Infrared and NMR analysis indicated that this solid contained predominantly Nylon-3 type polyamide structure. The intrinsic viscosity of this polymer was determined to be 0.33.

Comparison B—Polyamide Prepared from Beta-Alanine

The technique for preparing poly-beta-alanine from beta-alanine by the technique disclosed in U.S. Pat. No. 2,691,643 (Example 2) was followed except that a continuous bleed of nitrogen at 500 psig was not used. The experimental procedure was as follows.

In a 1 liter glasslined autoclave was placed 171.9 grams of beta-alanine. The reactor was flushed with nitrogen and left with a 200 psig nitrogen overpressure. The autoclave was then placed in an electric heater and heated for 4 hours at 200° C. to 275° C. until the internal temperature reached 200° C. Additional nitrogen was then added to bring internal pressure to 500 psig. The internal temperature was maintained at about 200° C. for 5 hours. At the end of this period the autoclave was allowed to cool to room temperature.

The autoclave was then opened and 167.8 grams of a solid polymer was recovered. Upon extracting overnight with hot distilled water, the water insolubility of this polymer was determined to be 39%. The infrared and NMR spectra showed the presence of amide structural units. Intrinsic viscosity of the water insoluble polyamide was 0.12.

Comparison C—Polyamide Prepared from Acrylonitrile

The procedure of U.S. Pat. No. 3,499,879 (Example 5) was followed using copper thiocyanate as the catalyst. The procedure was as follows.

In a 600 ml. glasslined autoclave equipped with a stirred was placed 161 grams of acrylonitrile, 55 grams of distilled water and 0.5 grams of cuprous thiocyanate. The autoclave was flushed with nitrogen and left with 50 psig nitrogen overpressure. The autoclave was then placed in an electric heater and heated with stirring for 1.3 hours at 200° C. until the internal temperature reached 175° C. The autoclave internal temperature was maintained at 175° C. to 180° C. for an additional 13 hours with stirring and then allowed to cool to room temperature.

The autoclave was then opened and the product was found to consist of two liquid layers with a light gray solid suspended in the bottom layer. One-half of each layer was recharged to the autoclave along with another 161 grams of acrylonitrile and 55 grams of distilled water. The autoclave was flushed with nitrogen and left with a 55 psig nitrogen overpressure. The autoclave was then placed in an electric heater and heated with stirring until the internal temperature reached 175° C. The autoclave was maintained at this temperature with stirring for 93 hours.

The autoclave was then opened and a very viscous brown grease was recovered. A portion of this product was extracted overnight with hot methanol to give a 16% methanol insoluble brownish-black solid. Infrared and NMR spectra showed the presence of amide units. Intrinsic viscosity of the methanol insoluble solid was determined to be 0.11.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

We claim:

1. A process for producing a resinous polymer containing carbonamide linkages wherein the carbonamide nitrogen is an integral part of the polymer backbone comprising polymerizing a composition comprising (1) at least one alpha, beta-unsaturated monocarboxylic acid or ammonium salt thereof and (2) ammonia.

2. The process of claim 1 wherein said process is conducted in the liquid phase.

3. The process of claim 1 wherein said polymer is produced by reacting at least one alpha, beta-unsaturated monocarboxylic acid.

4. The process of claim 3 wherein said alpha, beta-unsaturated monocarboxylic acid is acrylic acid.

5. The process of claim 3 wherein said alpha, beta-unsaturated monocarboxylic acid is methacrylic acid.

6. The process of claim 1 wherein said polymer is produced by reacting an ammonium salt of at least one alpha, beta-unsaturated monocarboxylic acid.

7. The process of claim 6 wherein said ammonium salt of at least one alpha, beta-unsaturated monocarboxylic acid is ammonium acrylate.

8. The process of claim 6 wherein said ammonium salt of at least one alpha, beta-unsaturated monocarboxylic acid is ammonium methacrylate.

9. The process of claim 1 wherein said process is conducted in the presence of a vinyl addition inhibitor.

10. The process of claim 1 wherein said alpha, beta-unsaturated monocarboxylic acid or ammonium salt thereof contains less than 40 carbon atoms.

11. The process of claim 1 wherein said alpha, beta-unsaturated monocarboxylic acid or ammonium salt thereof contains less than 6 carbon atoms.

12. The process of claim 1 wherein the alpha, beta-unsaturated monocarboxylic acid or ammonium salt thereof is represented by the following formula:

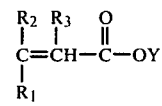

wherein Y is hydrogen or ammonium; and
wherein $R_1$, $R_2$ and $R_3$ are each independently selected from the group consisting of:

(1) hydrogen;
(2) $C_{1-30}$ alkyl;
(3) 5 to 7 member nitrogen containing heterocyclic radical;
(4) carbocyclic radical containing up to 30 carbon atoms;
(5) halide.

13. The process of claim 8 wherein $R_1$, $R_2$ and $R_3$ are each independently selected from the group consisting of:
(1) hydrogen;
(2) $C_{1-5}$ alkyl;
(3) 5 to 6 member carbocyclic radical.

14. The process of claim 8 wherein $R_1$, $R_2$ and $R_3$ are each independently selected from the group consisting of hydrogen and methyl.

15. The process of claim 1 wherein $R_1$ and $R_2$ are hydrogen.

16. The process of claim 1 wherein said process is conducted at a temperature between 100° C. and the decomposition temperature of the polymer.

17. The process of claim 16 wherein said process is conducted at a temperature between 125° C. and 200° C.

18. The process of claim 1 wherein said process is conducted at a pressure between 0 psig and 5000 psig.

19. The process of claim 18 wherein said process is conducted at a pressure between 50 psig and 2000 psig.

20. The process of claim 1 wherein said polymer is formed from two or more alpha, beta-unsaturated acids or ammonium salts thereof.

21. The process of claim 1 wherein said resinous polymer is recovered.

22. The process of claim 1 wherein said process is carried out in the absence of oxygen.

23. The process of claim 22 wherein said process is carried out in the presence of an inert gas.

24. The process of claim 1 wherein there is at least one mole of ammonia per mole of alpha, beta-unsaturated monocarboxylic acid.

25. The process of claim 1 wherein the polymer contains the following structural units:

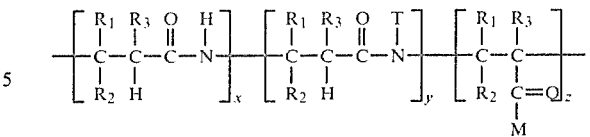

wherein $R_1$, $R_2$ and $R_3$ are each independently selected from the group consisting of:
(1) hydrogen;
(2) $C_{1-30}$ alkyl;
(3) 5 to 7 member nitrogen containing heterocyclic radical;
(4) carbocyclic radical containing up to 30 carbon atoms; and
(5) halide; and
wherein T is a branched chain site; and
wherein M is OH, $ONH_4$, $ONH_2T$ or NHT; and
wherein x, y and z are the relative ratios of amide and vinyl structural units in the polymer.

26. The process of claim 25 wherein the $(x+y)/z$ ratio is greater than 1.0.

27. The process of claim 25 wherein the $(x+y)/z$ ratio is greater than 3.0.

28. The process of claim 25 wherein the $(x+y)/z$ ratio is greater than 5.5.

29. The process of claim 1 wherein a water insoluble polymer is produced.

30. The process of claim 1 wherein the process is conducted in the presence of a solvent for the reactants or products or both.

31. A composition of matter comprising the resinous polymer produced by the process of claim 1.

32. The process of claim 1 wherein water is produced by said polymerization.

33. The process of claim 32 wherein the excess water is removed.

34. The process of claim 33 wherein the concentration of water is less than 5 moles of water per mole of the alpha, beta-unsaturated monocarboxylic acid or ammonium salt thereof.

35. The process of claim 34 wherein the water concentration is maintained at between 0.01 and 1.0 mole.

36. The process of claim 35 wherein the water concentration is maintained between 0.05 and 0.7 moles.

37. The process of claim 33 wherein said water is removed by the addition of a metal alkoxide.

38. The process of claim 1 wherein (1) is at least one ammonium salt of an alpha, beta-unsaturated monocarboxylic acid.

39. The process of claim 38 wherein substantially all of the ammonia in the reaction system is added in the form of the ammonium salt of an alpha, beta-unsaturated monocarboxylic acid.

* * * * *